May 12, 1931. V. L. OESTNAES 1,805,224
REFLECTOR AND METHOD OF PROVIDING THE REFLECTING SURFACE THEREOF
WITH MEANS FOR COLORING THE LIGHT REFLECTED THEREFROM
Filed March 16, 1928

INVENTOR
Victor L. Oestnaes
BY
Cyrus N. Anderson
ATTORNEY

Patented May 12, 1931

1,805,224

UNITED STATES PATENT OFFICE

VICTOR L. OESTNAES, OF WESTFIELD, NEW JERSEY, ASSIGNOR TO AMERICAN GASACCUMULATOR COMPANY, OF ELIZABETH, NEW JERSEY, A CORPORATION OF NEW JERSEY

REFLECTOR AND METHOD OF PROVIDING THE REFLECTING SURFACE THEREOF WITH MEANS FOR COLORING THE LIGHT REFLECTED THEREFROM

Application filed March 16, 1928. Serial No. 262,113.

In the use of light reflectors for signaling purposes upon the highways and streets for aiding traffic it is necessary practically that the signals shall be made to appear in different colors, depending upon the indication to be given thereby to traffic upon the said highways or streets.

The reflectors which have heretofore been employed have been of various kinds and of different constructions. One form of reflector which has been employed has consisted of a plate of glass produced by moulding, or otherwise, and having upon one side thereof, usually the rear side, projections of tetrahedral form; that is, projections in which the surfaces are related to each other as are the three sides forming a corner of a cube.

The light passing from the front through such a sheet of glass and through such projections is reflected in known manner by the thin layers of air upon the surfaces of the said projections back in a direction toward the source. In other words, if the surfaces be smooth and if the angles between the same be true right angles, as they may be, the reflected rays are returned in parallel relation to the incident rays. In commercial practice, however, the imperfections in the surfaces of the glass (both front and back) and deviations of the surfaces of the tetrahedral projections from exact right-angular relationship are sufficient to prevent reflection of the light backwardly in lines parallel with the incident rays; but on the contrary, there is more or less dispersion of the reflected rays, sufficient to widen the angle from which the reflector is visible, due to the reflected rays from the headlights of an automobile or the light from any other source.

The coloring of the light heretofore has been effected in various ways. In one way a colored transparent sheet of material, such as glass, has been located in front of the reflector, and in another way the glass has been pot-colored—that is to say, a suitable coloring material has been embodied in the glass during its manufacture. These methods or means employed to cause the coloration of the light after it has been reflected are objectionable, because a portion of the light is absorbed in its passage through the coloring medium to and from the reflecting surface.

It is an object of my invention to effect coloration of the reflected light by action of the reflector thereon by means the use of which does not result in the absorption of any appreciable amount of the light which may impinge upon the reflecting surface or surfaces.

It also is an object of the invention to provide means whereby a reflector having the capacity to effect or cause the coloration of reflected light may be produced simply and at a minimum of cost or expense.

My invention not only is of great utility for use in connection with the manufacture and construction of reflectors of the character already indicated, but it may be employed in connection with metal reflectors having central triple reflecting portions or surfaces. The invention is of utility and advantage also in connection with reflectors in which the reflecting surfaces may not be of central triple character. In other words, the invention is not limited in its utility or for its advantage to reflectors in which the reflecting portions or surfaces are of the central triple reflector type but also may be employed to advantage in connection with reflectors of planotype.

In order that the principles and the utilitarian qualities and characteristics of the invention may be readily and fully apprehended I shall refer to the accompanying drawing, in which I have illustrated the same as applied to or employed in connection with two forms or constructions of central triple reflectors, the one form consisting of a glass plate, upon one side of which are provided projections of tetrahedral shape, the other side thereof being plain; and the other consisting of sheet metal formed so as to provide a plurality of surfaces arranged to form reflecting portions the surfaces of which are located in right angular relation to each other, in known manner.

Figure 1:
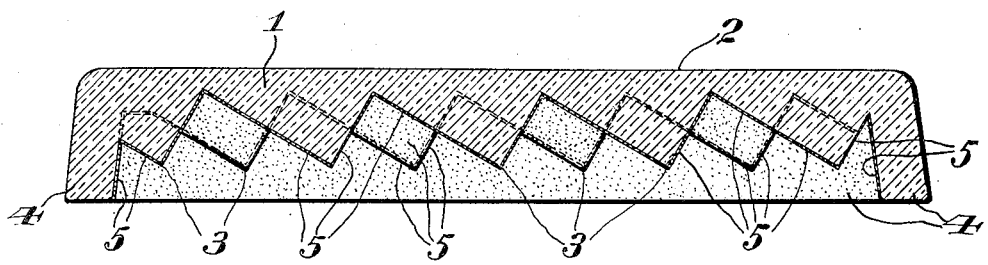
Fig. 1 is a view in transverse section of a reflector of central triple reflector type provided with the invention, the said section being taken on the line indicated at 1—1 in Fig. 2.
Figure 2:
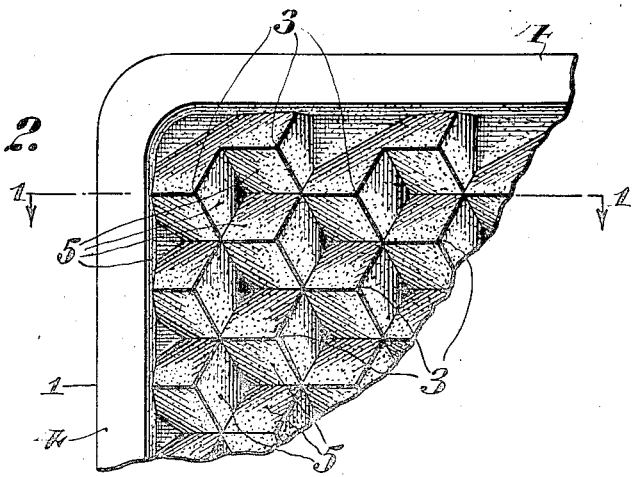
Fig. 2 is a view showing a corner portion of the reflector in rear elevation.

In the drawings I have shown in Figs. 1 and 2 a reflector consisting of a sheet 1 of suitable material such as glass, the front surface of which is plain, as indicated at 2, and the rear surface of which is provided with three-sided projections, as indicated at 3, the sides of which are positioned or located in right angular relation to each other, the said sides being related to each other as are the three sides of a corner of a cube.

The light rays from the headlights of an automobile or such rays from any other source which impinge upon the front, relatively plain, surface of the reflector pass through the said reflector and are reflected at the rear sides of the respective projections 3 and backwardly through the material of the reflector and are visible to persons who may be located at or in proximity to the source of the said rays. In the construction as illustrated in Figs. 1 and 2 the glass plate 1 is in the form of a panel and is provided at its edges with rearwardly extending flanges 4, the edges of which are located in a plane located beyond the rear ends of the projections 3. For the purpose of imparting color to the rays of light which are reflected at the rear sides of the projections 3 I have coated or covered the surfaces of the said projections with a coating, as indicated at 5, of suitable transparent material within which is embodied a coloring or dyeing ingredient of suitable material, such as a coal tar dye, which may be derived from an anilin base. The coating material may consist, and usually does consist, of clear lacquer, such as is in common commercial use. The coloring ingredient embodied in the said lacquer may be red, green, yellow, or other color as may be desired, and may be in such quantity as is desired and as necessary to provide the depth of color which may be required or desired. It will be recalled that in reflectors of the character of that illustrated in Fig. 1 the light is reflected by the layer of air which is in contact with the rear surface of the glass or other transparent material. It will be apparent, therefore, that in the reflector as illustrated in Figs. 1 and 2 the light which has passed from the front through the reflector also passes through the transparent thin coating thereon and is reflected back through the same and has imparted thereto the color characteristic of the coating, whether the said color be red, green, yellow, or of other tint or shade. The coating of transparent colored lacquer should be extended preferably to the inner sides of the flanges 4, to which reference has been made.

If desired, the thin coating or layer of transparent colored lacquer or other like material may be applied to the front plane surface of the reflector instead of upon the reflecting surface. If so applied it will be apparent that not only the incident rays but also the reflected rays pass therethrough, so that the color characteristic of the said coating is imparted to the reflected rays, which are rendered visible in the manner as is well understood in the art. Coatings of the character described may be applied, if preferred, to both sides of the reflector of transparent material.

Figure 3:
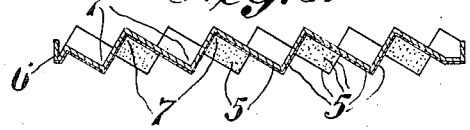
Fig. 3 is a view in transverse section of a reflector of similar type constructed of sheet metal.
Figure 4:
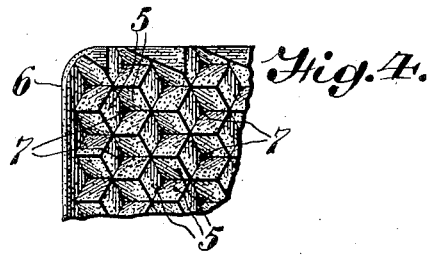
Fig. 4 is a view in front elevation of a corner portion of the reflector shown in Fig. 3.

In the construction as illustrated in Figs. 3 and 4 of the drawing I have shown, as previously stated, a reflector of central triple reflector type, consisting of sheet metal, as indicated at 6, having upon its opposite sides contiguously related or located holes or depressions 7 the three surfaces of each of which are located in right angular relation to each other as the sides of the corner of a cube. It will be apparent, therefore, that if these surfaces are rendered light-reflecting, as by the depositing thereon of a plating of silver or the like, the rays of light impinging thereon will be reflected in known manner. This will be the case whether the incident rays impinge upon the said reflector from one side or the other. In this description it will be assumed that the surfaces of the holes or the depressions upon one side only of the reflector structure are rendered light-reflecting, and such surfaces will be regarded as constituting the front or reflecting surface of the reflector.

By the provision of a thin coating or layer of transparent lacquer embodying a coloring ingredient, as above described, upon the reflecting surface of such a reflector the reflected rays may be colored as has been described in connection with the construction disclosed in Figs. 1 and 2. Both the incident and the reflected rays pass through such colored coating or layer, and the characteristic color of the latter is imparted to the reflected rays. As has been indicated, the intensity of the color of the reflected rays may be varied by varying the intensity or depth of color in the layer of lacquer or other suitable transparent material.

The lacquer in solution with the color or dye therein is applied (in liquid form) to the surface of a reflector. Such application may be effected by pouring the said solution on to the surface and immediately thereafter draining off the same so that the excess of the solution is removed, leaving only a thin film or coating of liquid containing the transparent material and the dye on the reflecting surface. Thereafter the liquid solvent is removed by evaporation, leaving a residue consisting of the transparent material and the dye therein.

Although I have described the colored coating or layer as consisting of lacquer with the desired amount of color material therein, it is to be understood that any other suitable material may be employed as the medium for carrying the color material or dye, provided that the same may be obtained in liquid form, as by dissolving in a suitable liquid solvent. Among the substances which may be mentioned as suitable carriers for the color materials are gun cotton in solution, sodium silicate (water glass), and the like.

The covering of the reflecting surface of a reflector with a thin coating or layer, as described, serves the additional purpose or function of protecting the said surface.

By my invention I have provided means whereby colored reflected rays of light may be obtained by a simple and economic means without the necessity of associating therewith separate sheets of transparent material, such as glass, which may be colored throughout the body thereof or which may be provided with a colored layer obtained by "flashing" in known manner.

Having thus described my invention, what I claim and desire to secure by Letters Patent is:

1. A light reflector comprising a transparent member having upon its rear side a plurality of projections the surfaces of each of which are arranged in right angular or approximately right angular relation to each other, and a transparent coating upon the said surfaces having embodied therein a coloring substance, the rear surface of the said coating being the reflecting surface of the said reflector.

2. A light reflector comprising a transparent sheet member having a plane front surface and having upon its rear side a plurality of projections the surfaces of each of which projections are angularly related to each other and the said surfaces being provided with a coating of transparent material having embodied therein a coloring substance, the rear surface of the said coating being the reflecting surface of the said reflector.

In testimony that I claim the foregoing as my invention, I have hereunto signed my name this 8th day of March, A. D. 1928.

VICTOR L. OESTNAES.